Apr. 10, 1923.
A. G. LARSON
1,451,228
FUEL FEEDING DEVICE FOR INTERNAL COMBUSTION ENGINES
Filed July 26, 1919 3 sheets-sheet 1
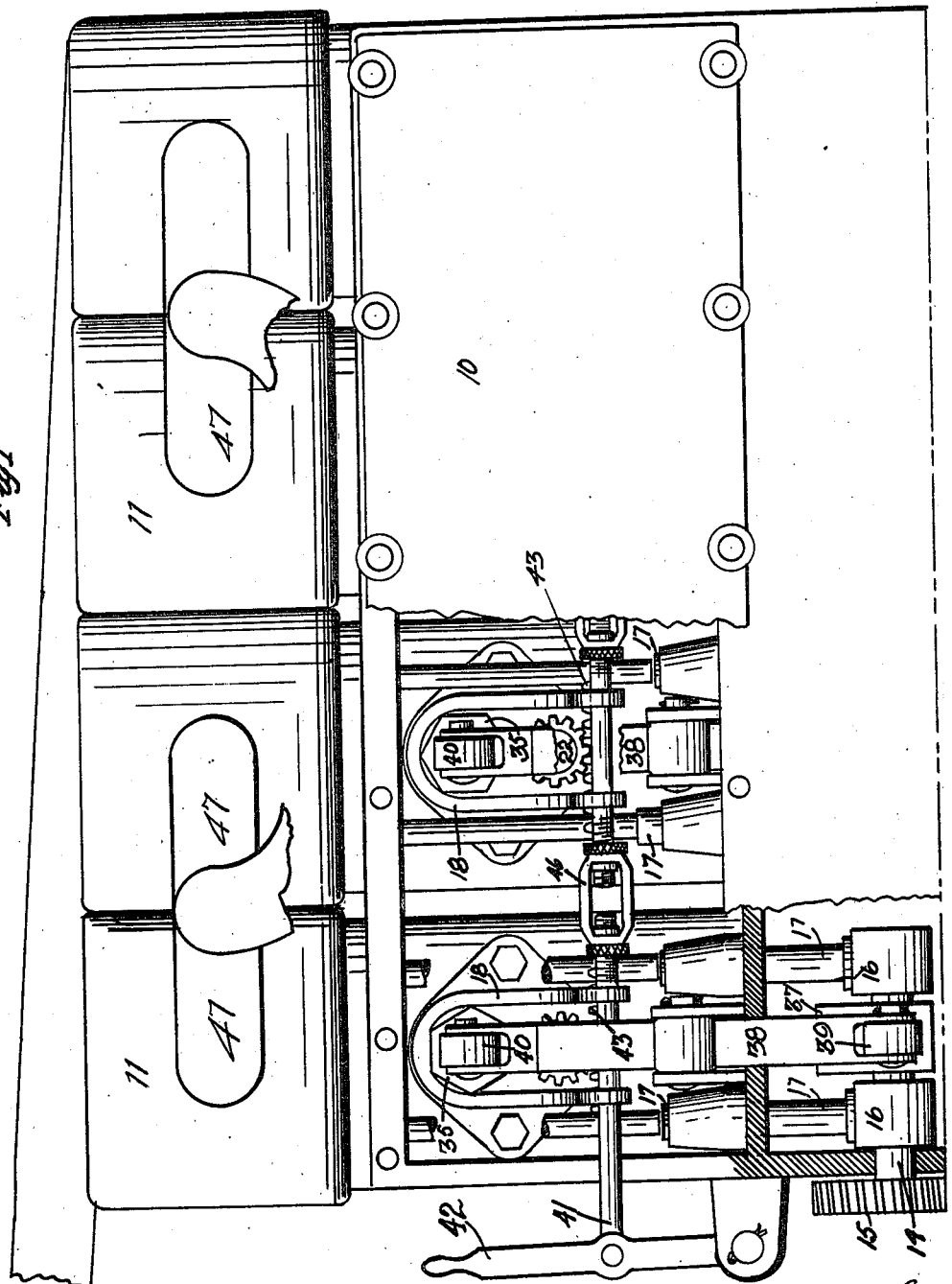
Inventor
Arvid G. Larson
By Owing & Bair
Attys

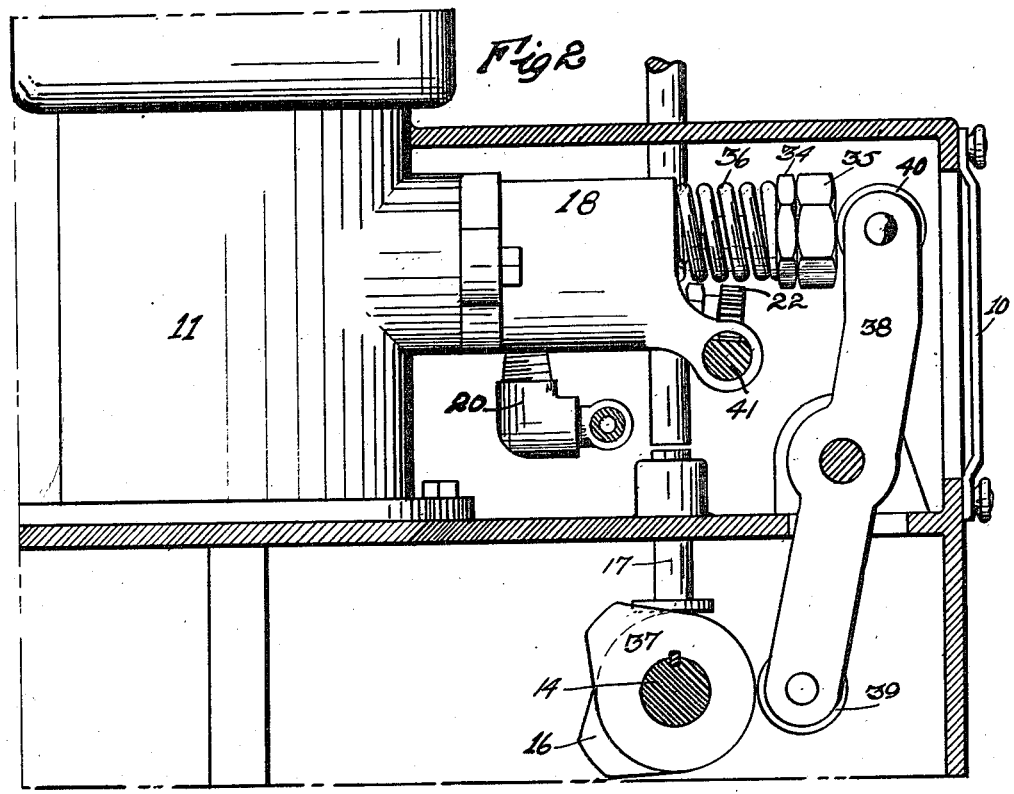
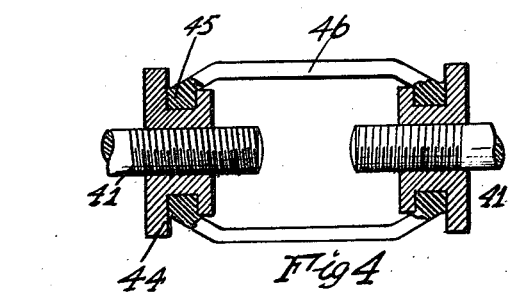

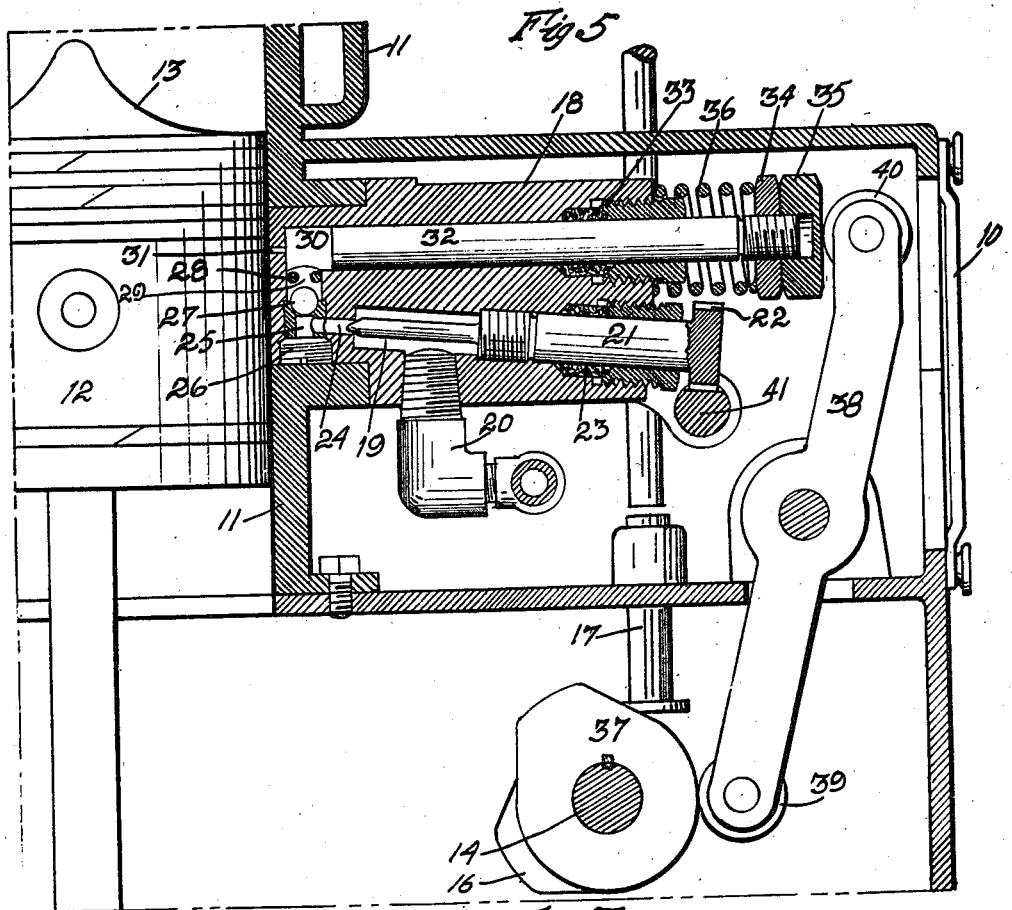
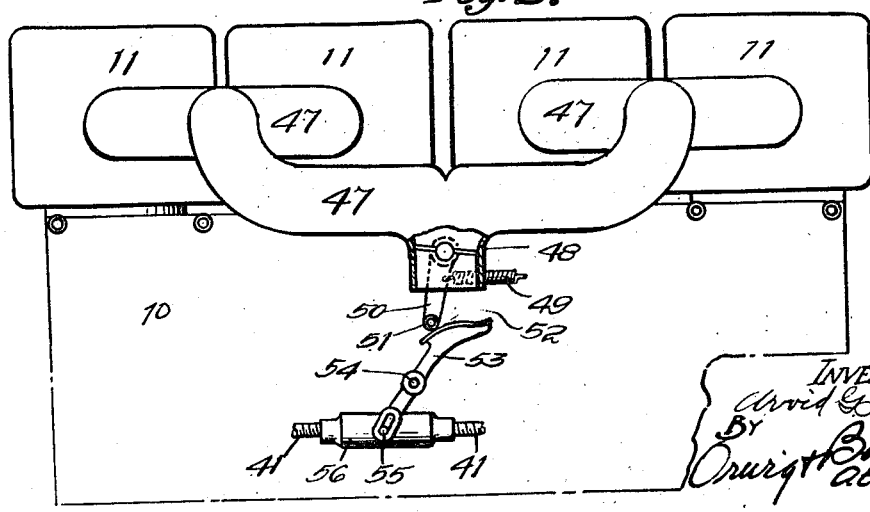

Patented Apr. 10, 1923.

1,451,228

UNITED STATES PATENT OFFICE.

ARVID G. LARSON, OF GRINNELL, IOWA, ASSIGNOR TO DODGE TOOL COMPANY, OF GRINNELL, IOWA.

FUEL-FEEDING DEVICE FOR INTERNAL-COMBUSTION ENGINES.

Application filed July 26, 1919. Serial No. 313,642.

*To all whom it may concern:*

Be it known that I, ARVID G. LARSON, a citizen of the United States, and resident of Grinnell, in the county of Poweshiek and State of Iowa, have invented certain new and useful Fuel-Feeding Devices for Internal-Combustion Engines, of which the following is a specification.

The object of my invention is to provide a device of the character named, of simple, durable and inexpensive construction, and designed to be used in connection with the ordinary types of internal combustion engines now in general use, such, for instance, as automobile engines.

A further object is to provide means whereby measured quantities of liquid fuel may be forced under pressure into the engine cylinders, and also to provide convenient and easily operated means whereby a quantity of liquid fuel injected or forced into the cylinder at each operation may be quickly and accurately adjusted to meet the requirements of use.

Still a further object is to provide means whereby in a device of this character the fuel adjusting means for each of several engine cylinders may be independently adjusted relative to each other, whereby the desired amount of fuel delivered to any one of the cylinders may be regulated or adjusted at will.

Still a further object is to provide, in a device of this character, a manually operated means whereby the amount of air admitted to the cylinders to be mixed with the liquid fuel may be adjusted or regulated at the will of the operator to suit the requirements for use. In this connection, I have provided means whereby the fuel supply operating means is connected with the air supply control, so that the air supply becomes proportionately greater as the fuel supply is increased.

My invention consists in the construction, arrangement, and combination of the various parts of the device, whereby the objects contemplated are attained, as hereinafter more fully set forth, pointed out in my claims, and illustrated in the accompanying drawings, in which:

Figure 1 shows a side elevation, with parts broken away, of an ordinary type of internal combustion engine having a number of cylinders, and illustrating my improved fuel feeding device as applied thereto.

Figure 2 shows an enlarged detail view, partly in section, illustrating an end view of one of the engine cylinders with my improved fuel feeding device applied thereto.

Figure 3 shows a detail side view illustrating the means for controlling the supply of air to the intake manifold of the engine.

Figure 4 shows an enlarged, detail, sectional view illustrating the means for independently adjusting the various fuel regulating needle valves for controlling the amount of liquid fuel delivered to the several cylinders of a multiple-cylinder engine; and Figure 5 shows an enlarged, detail sectional view illustrating a portion of an engine cylinder and piston with my improved fuel feeding device applied thereto.

Referring to the accompanying drawings, I have used the reference numeral 10 to indicate generally the internal combustion engine, and 11 the cylinders thereof. In each cylinder is a piston 12 of the ordinary type. At the upper end of each piston is a baffle block 13 having its operating face curved or inclined upwardly and toward the center of the cylinder, as clearly illustrated in Figure 5, for purposes hereinafter made clear.

Forming part of the engine is a valve operating cam shaft 14 which may be driven from a gear wheel 15 on one end and which is provided with cams 16 for operating the inlet and exhaust valve rods 17. Inasmuch as this cam shaft and the valves and their operating rods are of the ordinary construction now in common use on internal combustion engines, it is believed unnecessary to give further detailed drawings and description thereof.

Adjacent to the lower end of each engine cylinder is a pump body member 18, projecting laterally from the engine cylinder and preferably having its inner face forming part of the inner wall of the cylinder. In this body 18 is a chamber or recess 19 to receive a needle valve, and which communicates with a liquid fuel supply pipe 20.

It will be noted that the parts just described, whereby liquid fuel is furnished, may be located above, below or at either side of the pump chamber or body member without effecting their functions.

Screwed into the chamber 19 is a needle valve 21 of ordinary construction and provided with a pinion 22 on its outer end. I also provide an ordinary stuffing box 23 surrounding the stem of the needle valve to prevent leakage. The inner end of the chamber 19 communicates through a passageway 24 with a ball valve chamber 25 which is inserted in the body 18 and held in place by a screw plug 26.

On top of the ball valve chamber 25 is a ball valve 27 to normally close the opening through the upper end of the ball valve chamber 25. Pins 28 are provided for limiting the upward movement of the ball. It will be understood that the chamber 25 and ball valve 27 form a check valve, and that other forms of check valves, which will accomplish the same purpose may be substituted therefor.

Above the ball valve 27 is a chamber or passageway 29 communicating with a pump chamber 30 in the body 18. This pump chamber 30 communicates through the small passageway 31 with the interior of the engine cylinder and is positioned relative to the piston so that when the piston approaches the end of its downward movement it will pass the passageway 31 so that there will be communication between the chamber 30 and the interior of the cylinder during the time that the piston is making the last part of its downward movement and the initial part of its upward movement.

Mounted in the pump chamber 30 is a cylindrical pump plunger or body 32, extended outwardly through the body 18 and provided with a stuffing box 33 of ordinary construction. The outer end of the pump body 32 is screw-threaded and provided with an adjusting nut 34 and a lock nut 35. Between the adjusting nut 34 and the body 18 is a coil spring 36.

For each engine cylinder I have provided on the cam shaft 14 a cam 37 near the cams 16. Pivotally supported above each cam 37 is a lever 38 having a roller 39 at its lower end to engage the cam 37, and another roller 40 at its upper end to engage the nut 35, whereby upon the rotation of the shaft 14 the pump body 33 will be moved inwardly by the lever 38 and outwardly by its spring 36, as hereinafter more fully explained.

For the purpose of conveniently and easily operating all of the needle valves 21 simultaneously, I have provided a sliding rack bar 41 provided with a lever 42 whereby it may be operated, said rack bar being provided with cog teeth 43 to engage each of the pinions 22. Obviously, a movement of the lever 42 will turn each of the needle valves 21 in direction to either open or close the needle valve, as may be desired.

In this connection, I have also provided a means whereby when desired any one of the needle valves may be manually adjusted independently of the others. This means is clearly illustrated in Figure 4, and comprises two grooved collars 44 screwed to the opposite ends of the various sections of the rack bar 41, and this pair of grooved collars is connected by two rings 45, rotatably mounted in the grooves thereof and connected by bars 46. Obviously by turning the grooved collars 44 any one of the needle valves may be independently adjusted, and thereafter all of the valves will be worked in unison by means of the lever 42.

For the purpose of controlling the supply of air to be admitted to the engine cylinders I provide in the air intake manifold 47, a so-called butterfly valve 48 controlled by a controlling lever 50. This intake manifold connects with the air inlet ports of the various engine cylinders in a well-known manner not herein specifically illustrated. The lever 50 is normally held in closed position by a spring 49 and is provided with a roller 51 at its free end designed to coact with a cam face 52 at the upper end of a lever 53. The lever 53 is pivoted between its ends at 54 to any suitable portion of the engine, and the lower end of the lever is slotted to receive a pin 55, which extends from a turnbuckle body 56 mounted on the rack bar 41. From the construction of the parts just described, it will be seen that forward movement of the rack bar 41 (which tends to open the needle valves 19) will cause a swinging of the lever 53 and lever 50, thereby swinging open the butterfly valve 48 and admitting air to the intake manifold 47.

The cam face 52 of the lever 53 is so arranged that during the first portion of the forward movement of the rack bar 41, it will cause the lever 50 to move a proportionately less distance, than during the latter part of the forward movement of the bar 41. From this construction, it will be seen that when the engine is running slowly on first being started, then the air supply will be proportionately less relative to the fuel supply than is the case, where the engine is running at high speed. It will also be noted that the turn-buckle body 56 may be moved longitudinally on the rack bar 41, so that the initial position of the butterfly valve may be adjusted.

In practical use, and assuming that the engine is being operated, it will be obvious that when the piston 12 passes below the fuel inlet passageway 31, and assuming further that at the same instant the pump body 32 was being moved toward the cylinder, the supply of liquid fuel contained in the chamber 30 above the needle valve will be forced or injected positively under pressure against the inclined baffle plate 13, whereupon the liquid fuel will be deflected upwardly toward the center of the engine cylinder, and by reason of the heat in the engine cylinder it will be instantly turned into fine spray and thoroughly commingled with the air to produce a combustible mixture. Then as soon as the upper end of the piston on its upward stroke passes the passageway 31, the supply of liquid fuel would be cut off. Then as the pump body 32 is moved outwardly by its spring 36, a partial vacuum will be created in the pump chamber 30, and the ball valve 29 will be raised to permit the liquid fuel to pass through the needle valve upwardly and into the pump chamber 30.

During the stroke of the piston immediately after the explosion the pump body 32 is not operated by the cam, and the gas pressure within the cylinder will prevent any fuel from passing through the passageway 31 into the chamber 30 during the downward limit of the piston stroke. However, upon the next downward movement of the piston there will be a slight vacuum in the engine cylinder so that the fuel charge is easily forced into the cylinder by the pump. The ball valve 27 obviously prevents all possibility of the liquid fuel being forced by the pump 32 back through the needle valve during the operation of the pump.

Assuming that in the ordinary use of the engine the needle valve is so adjusted that just enough liquid fuel is permitted to pass into the chamber 30 to half fill it between the pump strokes, and assuming further that it is desired to obtain a richer mixture and accelerate the speed of the engine, then the operator moves the lever 42 in such a manner as to further open the needle valve, whereupon a greater quantity of liquid fuel is admitted into the engine between the pump movements. Furthermore, the amount of air that is admitted to the engine cylinder during each intake movement of the piston is automatically controlled by means of the lever 50 and the butterfly 48 in the intake manifold, to correspond with the engine speed.

It will be obvious that by means of my improvement, the liquid fuel will be positively injected or forced into the cylinder at the proper period of the piston stroke, and furthermore, that the amount of liquid fuel delivered to the cylinder upon each pump movement will be accurately measured, and at the same time readily and easily adjustable to increase or diminish its quantity.

I claim as my invention:

1. The combination with an internal combustion engine of the piston type, of a means for forming a fuel chamber adjacent to the engine cylinder, there being a restricted passageway leading from said fuel chamber to the interior of the cylinder, the arrangement of said passageway being such that it is normally closed by the piston except when the piston is at the lower or outer end of its stroke, a plunger in said fuel chamber for positively forcing fuel therein through said restricted passageway when the plunger is operated, a means for supplying liquid fuel to said fuel chamber, a one-way valve between the fuel supply and said compartment, normally closed when the plunger moves toward the cylinder, means actuated by the engine for operating the plunger, controllable means for admitting air to the engine, and means for controlling the flow of fuel to the fuel chamber, and means for simultaneously actuating said last means and said controllable means.

2. The combination with an internal combustion engine of the piston type, of a means for forming a fuel chamber adjacent to the engine cylinder, there being a restricted passageway leading from said fuel chamber to the interior of the cylinder, the arrangement of said passageway being such that it is normally closed by the piston except when the piston is at the lower or outer end of its stroke, a plunger in said fuel chamber for positively forcing fuel therein through said restricted passageway when the plunger is operated, a means for supplying liquid fuel to said compartment, a one-way valve between the fuel supply and said compartment, normally closed when the plunger moves toward the cylinder, means actuated by the engine for operating the plunger, and a needle valve arranged in the fuel supply device for regulating the flow to the said one-way valve, said needle valve being provided with a pinion, and a manually controllable rack bar for operating the pinion to regulate the needle valve.

3. The combination with an internal combustion engine of the piston type, having a plurality of cylinders, with a fuel supply device for each cylinder comprising a valve body arranged adjacent to the cylinder and provided with a force pump chamber, there being a restricted passageway leading from the force pump chamber to the interior of the cylinder, positioned to be normally closed by the engine piston and open to the interior of the cylinder only when the piston is at or near the lower or outer end of its stroke, a pump plunger in said chamber, an adjustable head on the outer end of the pump plunger, a spring for normally holding said head outwardly away from the cylinder, a means actuated by the engine cam shaft for forcing the said pump plunger inwardly, a means for conducting liquid fuel from a source of supply to the said pump chamber, a one-way valve in said means, a needle valve between the one-way valve and the source of liquid fuel supply and means for simultaneously actuating said needle valves.

4. The combination with an internal combustion engine of the piston type, of a means for forming a fuel chamber adjacent to the engine cylinder, there being a restricted passageway leading from said fuel chamber to the interior of the cylinder, the arrangement of said passageway being such that no fuel will pass therethrough, except when the piston is at the lower or outer end of its stroke, a plunger in said fuel chamber for positively forcing fuel therein through said restricted passageway when the plunger is operated, a means for supplying liquid fuel to said compartment, a one-way valve between the fuel supply and said compartment, normally closed when the plunger moves toward the cylinder, means actuated by the engine for operating the plunger, a manually operated liquid fuel regulating valve arranged between the source of fuel supply and the said one-way valve, and an automatic means for increasing the proportion of air admitted to the cylinder relative to the fuel injected therein, as the quantity of fuel injected is increased.

5. The combination with an internal combustion engine of the piston and cylinder type, having means in connection therewith for controlling the amount of fuel supplied to the cylinders, of an air intake manifold, a valve deposed at the entrance of said manifold, a lever adapted to actuate said valve, a second lever deposited adjacent to the first described lever, a cam face at one end of said second lever adapted to coact with the first lever, and so shaped, that swinging of the second lever will cause a gradually increasing amount of movement of the first lever, and means for operatively connecting said second lever with the fuel controlling means whereby the supply of air to the intake manifold may become proportionately greater relative to the supply of fuel, as the supply of fuel is increased.

6. The combination of a multiple-cylinder internal combustion engine of the piston type, there being a restricted communicating passageway to the interior of the cylinder, normally closed by the piston and opened only when the piston is at the lower or outer limit of its movement, a pump plunger therein, means for operating the pump plunger, a means for conducting liquid fuel to said pump, a one-way valve in said conducting means, a pinion on each needle valve, and a rack bar, formed of independent members, for each cylinder, there being between the independent members of the rack bar an adjusting device whereby each needle valve may be adjusted independently of the others, and all the needle valves may be opened or closed by movement of the said rack bar, for the purposes stated.

7. The combination with an internal combustion engine of the piston type, of a means for forming a fuel chamber adjacent to the engine cylinder, there being a restricted passageway leading from said fuel chamber to the interior of the cylinder, the arrangement of said passageway being such that no fuel will pass therethrough, except when the piston is at the lower or outer end of its stroke, a plunger in said fuel chamber for positively forcing fuel therein through said restricted passageway when the plunger is operated, a means for supplying liquid fuel to said compartment, a one-way valve between the fuel supply and said compartment, normally closed when the plunger moves toward the cylinder, means actuated by the engine for operating the plunger, a manually operated liquid fuel regulating valve arranged between the source of fuel supply and the said one-way valve, and means for regulating the amount of air admitted into the intake manifold.

Des Moines, Iowa, May 13, 1919.
ARVID G. LARSON.